United States Patent
Jeong (10) Patent No.: US 10,120,549 B2
(45) Date of Patent: Nov. 6, 2018

(54) SYSTEM AND METHOD FOR VIRTUAL PHOTOGRAPHING SERVICE

(71) Applicant: DS GLOBAL, Seoul (KR)

(72) Inventor: Ik Seong Jeong, Seoul (KR)

(73) Assignee: DS GLOBAL, Seoul (KR)

( * ) Notice: Subject to any disclaimer, the term of this patent is extended or adjusted under 35 U.S.C. 154(b) by 0 days.

(21) Appl. No.: 14/909,232

(22) PCT Filed: Jan. 30, 2015

(86) PCT No.: PCT/KR2015/001019
§ 371 (c)(1),
(2) Date: Feb. 1, 2016

(87) PCT Pub. No.: WO2016/122024
PCT Pub. Date: Aug. 4, 2016

(65) Prior Publication Data
US 2017/0329496 A1 Nov. 16, 2017

(51) Int. Cl.
*G06F 3/0488* (2013.01)
*G06F 3/0484* (2013.01)
(Continued)

(52) U.S. Cl.
CPC .......... *G06F 3/04845* (2013.01); *G06F 3/017* (2013.01); *G06F 3/04886* (2013.01);
(Continued)

(58) Field of Classification Search
None
See application file for complete search history.

(56) References Cited

U.S. PATENT DOCUMENTS

2008/0291214 A1* 11/2008 Wasserman ............ H04N 5/272
345/619
2012/0120257 A1* 5/2012 Corn .................. H04N 1/00132
348/207.1
(Continued)

FOREIGN PATENT DOCUMENTS

JP 2008228262 9/2008
KR 20030010267 2/2003
(Continued)

OTHER PUBLICATIONS

International Search Report—PCT/KR2015/001019 dated Oct. 14, 2015.

*Primary Examiner* — Ryan M Gray
(74) *Attorney, Agent, or Firm* — Cantor Colburn LLP (57) ABSTRACT

A virtual photographing service system comprises: a main terminal for transmitting an invitation message to sub-terminals of photographing objects through a predetermined service app and, if all the sub-terminals receiving the invitation message complete connection, specifying a position of each photographing object and performing photographing according to direction of a user; at least one of sub-terminals for driving a camera module, transmitting a real-time image to the main terminal, and participating in the photographing of the main terminal, if the invitation message is received from the main terminal; and a server for extracting, if a photographed image is received from the main terminal, an image of each photographing object from the received image according to an object segmentation technique, and completing the image by inserting each of the extracted images at a specified position on a final image.

4 Claims, 10 Drawing Sheets

(51) Int. Cl.
*G06Q 50/10* (2012.01)
*H04N 5/225* (2006.01)
*G06Q 10/10* (2012.01)
*G06F 3/01* (2006.01)

(52) U.S. Cl.
CPC ............ *G06Q 10/10* (2013.01); *G06Q 50/10* (2013.01); *H04N 5/225* (2013.01); *G06F 2203/04808* (2013.01); *G06T 2210/22* (2013.01)

(56) References Cited

U.S. PATENT DOCUMENTS

| | | | | |
|---|---|---|---|---|
| 2012/0281101 | A1* | 11/2012 | Fujinawa | H04N 1/00127 348/207.1 |
| 2013/0188063 | A1* | 7/2013 | Cameron | H04N 5/272 348/207.1 |
| 2015/0009359 | A1* | 1/2015 | Zaheer | H04N 1/6077 348/223.1 |
| 2015/0296340 | A1* | 10/2015 | Crutchfield | H04W 4/023 455/456.1 |
| 2016/0077422 | A1* | 3/2016 | Wang | G03B 37/04 348/38 |

FOREIGN PATENT DOCUMENTS

| | | |
|---|---|---|
| KR | 20050067438 | 7/2005 |
| KR | 20060132430 | 12/2006 |
| KR | 20110064540 | 6/2011 |
| KR | 20150017181 | 2/2015 |

\* cited by examiner

SYSTEM AND METHOD FOR VIRTUAL PHOTOGRAPHING SERVICE

TECHNICAL FIELD

The present invention relates to a virtual photographing service, and more specifically, to a system and method for a virtual photographing service, in which users at remote sites participate online.

BACKGROUND ART

Recently, smart phones rapidly distributed in several years combine mobile communication and personal computer's functions (installation of an operating system, drive of an application, Internet connection functions) and have become part of our real life.

In addition, since innumerably diverse applications (hereinafter, referred to as 'app's) of the smart phones have been developed and continue to be evolved, they provide a lot of conveniences based on ideas useful in real life.

Although distribution of the smart phones and development of the applications continue to be expanded, applications related to virtual photographing for taking images in an online space and allowing users to participate in online are insufficient quantitatively (in number) as well as qualitatively.

DISCLOSURE OF INVENTION

Technical Problem

Therefore, the present invention has been made in view of the above problem, and it is an object of the present invention to provide a virtual photographing service system, in which users at remote sites perform photographing online using a previously stored image or a virtual image as a background.

Additional features and advantages of the present invention will be described below and, in part, will be apparent from the description or learned by practice of the present invention. The objectives and other advantages of the present invention will be implemented in particular by means of the structure pointed out in the claims as well as the description described below and added drawings.

Technical Solution

To accomplish the above object, according to one aspect of the present invention, there is provided a virtual photographing service method including the steps of: executing a service app according to handling of a user by a main terminal 100; transmitting an invitation message to sub-terminals 200A, 200B and 200C of photographing objects through the executed service app; executing a service app and connecting to the main terminal 100 by each of the sub-terminals 200A, 200B and 200C receiving the invitation message; specifying a position of each photographing object and performing photographing according to direction of the user by the main terminal 100, if all the sub-terminals receiving the invitation message complete the connection; transferring a photographed image to a server by the main terminal 100 and extracting an image of each photographing object from the transferred image by the server 300 according to a predetermined object segmentation technique; completing and storing the image by inserting each of the extracted images at a specified position on a final image by the server 300; and transmitting the completed image to the sub-terminals 200A, 200B and 200C of the photographing objects.

In addition, the step of connecting to the main terminal 100 by each of the sub-terminals receiving the invitation message preferably includes the steps of: accepting the invitation and connecting to the main terminal 100; and driving a camera module and participating in the photographing by transmitting a moving image of a user in real-time or an image stored in an album according to selection of the user.

In addition, the virtual photographing service method preferably further includes the steps of: setting, if all the sub-terminals receiving the invitation message complete the connection, a background image type for virtual photographing by the main terminal 100; specifying a position of a photographing object on a set background image according to input of the user; and displaying an image of a corresponding photographing object in an area of each specified position.

In addition, the sub-terminals 200A, 200B and 200C of the photographing objects preferably associate with the main terminal 100 in real-time and display a screen of the main terminal 100 as is on a screen of their own.

In addition, the step of connecting to the main terminal 100 by each of the sub-terminals receiving the invitation message preferably further includes the step of setting text chatting or voice chatting with the main terminal 100 according to selection of a user.

According to another aspect of the present invention, there is provided a virtual photographing service system including: a main terminal 100 for transmitting an invitation message to sub-terminals 200A, 200B and 200C of photographing objects through a predetermined service app and, if all the terminals receiving the invitation message complete connection, specifying a position of each photographing object and performing photographing according to direction of a user; at least one of sub-terminals 200A, 200B and 200C for driving a camera module, transmitting a real-time image to the main terminal 100, and participating in the photographing of the main terminal 100, if the invitation message is received from the main terminal 100; and a server 300 for extracting, if a photographed image is received from the main terminal 100, an image of each photographing object from the received image according to an object segmentation technique, and completing the image by inserting each of the extracted images at a specified position on a final image.

In addition, the main terminal 100 preferably sets, if all the sub-terminals receiving the invitation message complete the connection, a background image type for virtual photographing, specifies a position of a photographing object on a set background image according to input of the user, and displays an image of a corresponding photographing object in an area of each specified position.

In addition, at least one of the sub-terminals 200A, 200B and 200C preferably associates with the main terminal 100 in real-time and displays a screen of the main terminal 100 as is on a screen of its own.

Advantageous Effects

The present invention implements a virtual photographing service system which performs photographing by allowing users at remote sites to participate in an online virtual space.

By implementing a service app for virtual photographing service, the present invention is expected to further easily and conveniently provide functions such as inserting a member (a friend, a family member or the like) who cannot participate in a travel or a meeting, inserting a geese father (a lonely father) living apart from family members in a family photo, leaving video recordings of members participating in an online meeting, providing commemorative photographing with a celebrity (an entertainer, a sport star or the like), providing a photographing service with a star in an online fan club or the like.

BEST MODE FOR CARRYING OUT THE INVENTION

Hereinafter, preferred embodiments of the present invention will be described in detail with reference to the accompanying drawings. A suffix "module" or "unit" used for constituent elements disclosed in the following description is merely intended for easy description of the specification, and the suffix itself does not give any special meaning or function. Therefore, it should be noted that the "module" and the "unit" may be used interchangeably with each other.

The idea of the present invention is to allow users at remote sites to participate in an online virtual space having a predetermined background image and implement a virtual photographing service system for performing photographing using a smart device provided with a photographing function and a communication function.

Figure 1:
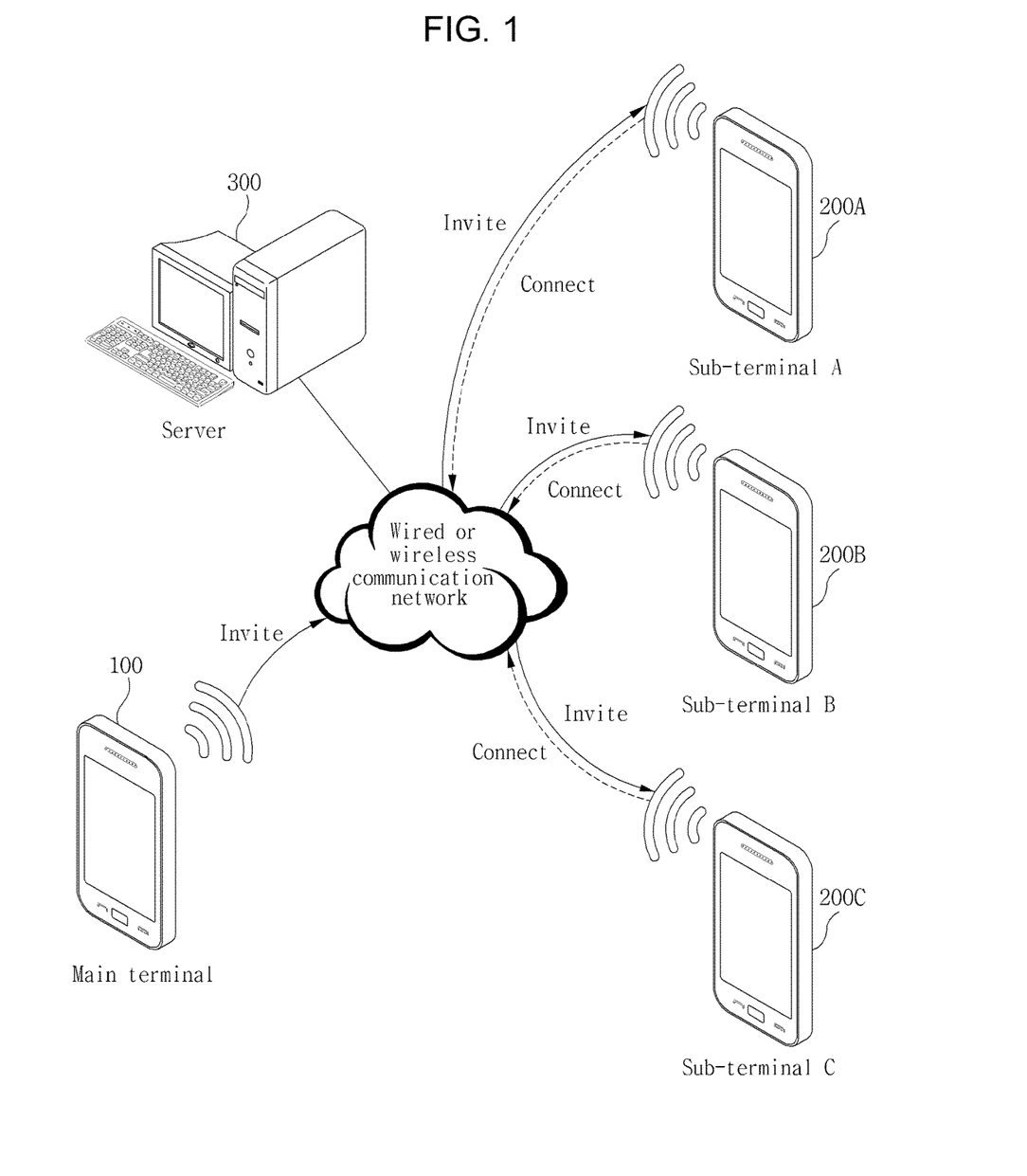
FIG. 1 is a block diagram showing the configuration of a virtual photographing service system according to the present invention.

FIG. 1 is a block diagram showing the configuration of a virtual photographing service system according to the present invention.

As shown in FIG. 1, a virtual photographing service system according to the present invention is configured of a main terminal 100, sub-terminals 200A, 200B and 200C and a server 300.

If a service app is executed, the main terminal 100 drives a camera module and sets a background image type (e.g., a real-time image (such as a still image or a moving image), an image stored in an album or the like) for virtual photographing according selection of a user.

Then, the main terminal 100 transmits an invitation message to the sub-terminals 200A, 200B and 200C, i.e., terminals of photographing objects through the service app, and if the terminals receiving the invitation message accept the invitation and connect to the service, the main terminal 100 specifies a position of each photographing object according to direction of the user and performs photographing. Then, if the photographing is completed, the main terminal 100 transfers the photographed image to the server 300.

If the photographed image is received from the main terminal 100, the server 300 extracts an image of each photographing object from the received image according to an object extraction technique. At this point, the object extraction technique means a technique of detecting an extraction object by separating the extraction object from the background image along the contour of the object. The object extraction technique includes an object segmentation technique or the like.

The server 300 completes a final image by inserting (overlapping) the extracted images at predetermined positions. Then, the server 300 stores the completed final image in the memory and transmits the final image to the main terminal 100 and the sub-terminals 200A, 200B and 200C of the photographing objects.

If the invitation message is received from the main terminal 100, each of the sub-terminals 200A, 200B and 200C executes the service app and connects to the service (or the main terminal 100) after accepting the invitation according to direction of the user. Then, the sub-terminals drive a camera module and participate in photographing by transmitting a real-time image (e.g., a still image or a moving image) or an image stored in an album to the main terminal 100 according to selection of a user.

While the photographing is progressed, the sub-terminals 200A, 200B and 200C associate with the main terminal 100 in real-time and display the photographing screen of the main terminal 100 as is on the terminal screen of their own so that the users of the sub-terminals 200A, 200B and 200C may take a pose matching to their personality.

In addition, the sub-terminals 200A, 200B and 200C set a chatting type (e.g., text chatting, voice chatting or the like) in advance according to selection of a user so that the users of the terminals 100, 200A, 200B and 200C may converse and communicate with each other while the photographing is progressed.

The main terminal 100 and the sub-terminals 200A, 200B and 200C may be a notebook computer, a desktop computer or a mobile communication terminal (e.g., a cellular phone, a PDA, a smart phone, a tablet PC or the like) provided with a photographing function and a communication function.

The main terminal 100 and the sub-terminals 200A, 200B and 200C may include a camera module, a wireless communication unit, an Audio/Video (A/V) input unit, a user input unit, a sensing unit, an output unit, a memory, an interface unit, a control unit, a power supply unit and the like. Since all of the components are not indispensable, the terminals may have more or less components than the components of this embodiment.

The main terminal 100 and the sub-terminals 200A, 200B and 200C may be provided with a device or an application performing the virtual photographing service or store the application in the memory. A virtual photographing service app according to the present invention may be provided through an application shop such as an Android market, an app store or the like, and a user downloads the service app in advance and installs the service app in the smart user terminal 100. The service app according to the present invention may be installed in the control unit (not shown, CPU) when the terminal is manufactured, and in this case, the service app is regarded as a control unit.

Figure 2:
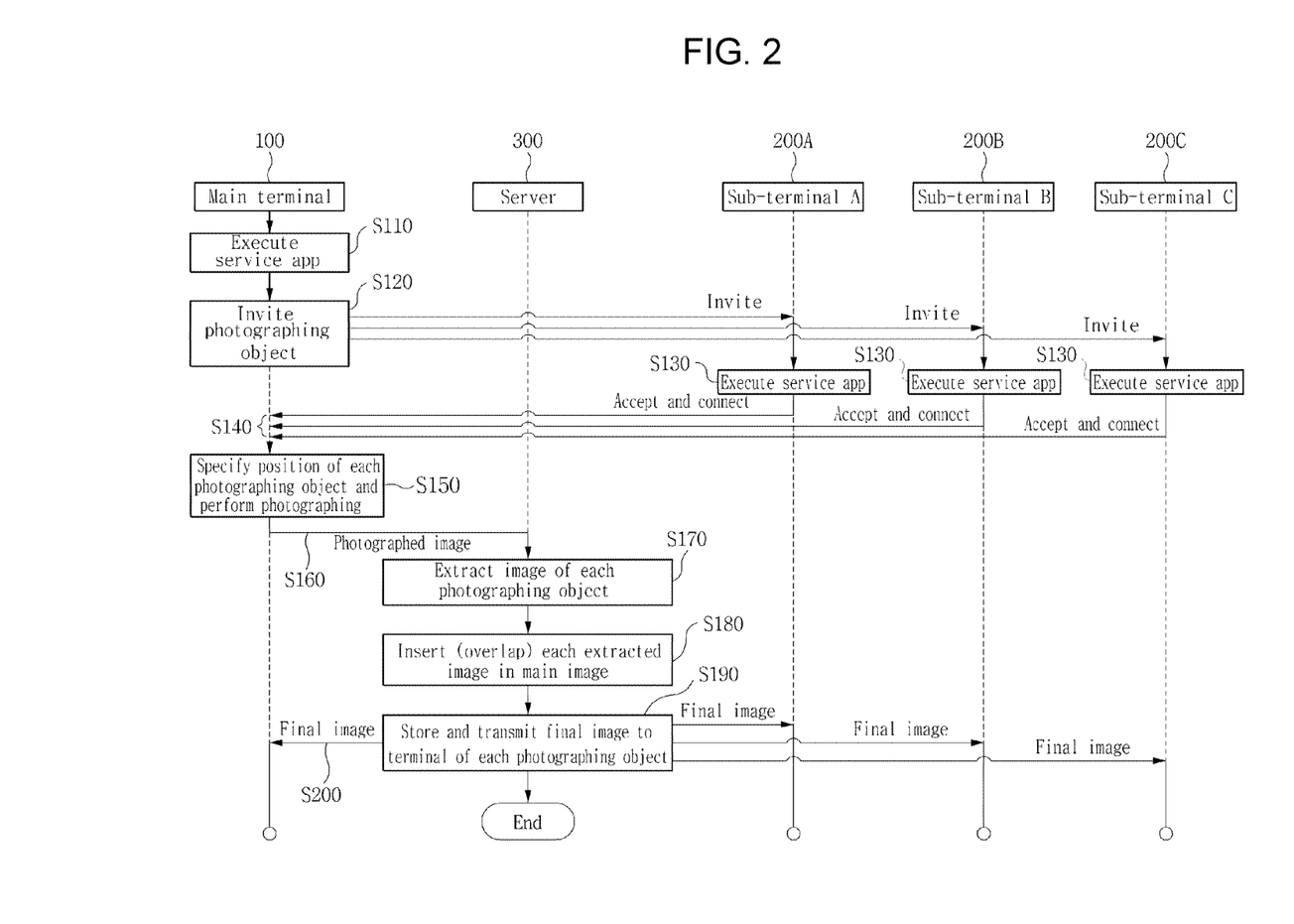
FIG. 2 is a flowchart illustrating operation of a virtual photographing service system according to the present invention.

FIG. 2 is a flowchart illustrating operation of a virtual photographing service system according to the present invention.

Figure 3:
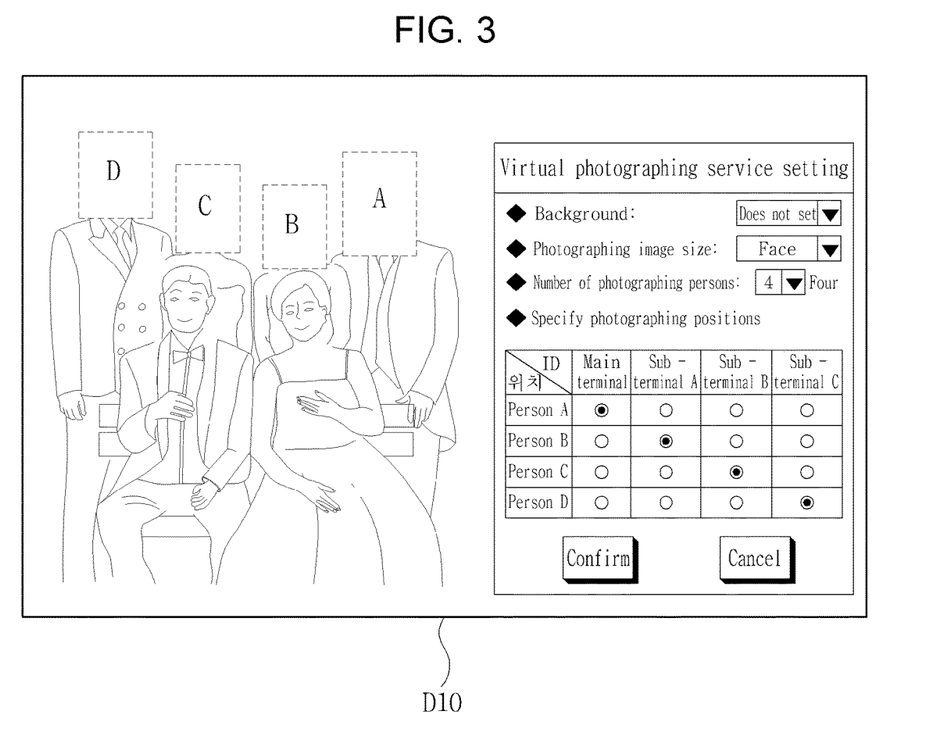
FIG. 3 is a view showing an example of a virtual photographing service setting screen according to the present invention.

As shown in FIG. 2, if a user executes the virtual photographing service app (hereinafter, referred to as a 'service app') stored in the main terminal 100 (step S110), the main terminal 100 drives the camera module according to execution of the app and sets a background image type (e.g., a real-time image (such as a still image or a moving image), an image stored in an album or the like) for virtual photographing and a photographing image size (e.g., a face, a half body, a full body or the like) according to selection of the user as shown in the setting screen D10 of FIG. 3. FIG. 3 is a view showing an example of setting 'face' as a photographing image size. The setting procedure (e.g., a background image type, a photographing image size or the like) can be processed in step S150 described below as needed by the user.

Then, the number of photographed persons (photographing objects) is input, and photographing objects (e.g., friends, family members, members, colleagues or the like) are selected from a phone book provided by the service app (or the Operating System (OS) of the terminal). FIG. 3 is a view showing an example of a virtual photographing service setting screen according to the present invention, and it is a virtual photographing service in which the number of photographed persons (photographing objects) is set to four and the photographing image size is set to 'face'. When the photographing image size is set to 'face', only the faces of the photographing objects are extracted and inserted in a previously photographed image (e.g., an image stored in an album).

If the photographing objects are selected, the main terminal 100 transmits an invitation message to the sub-terminals 200A, 200B and 200C of the selected photographing objects through the service app (step S120).

Then, if the invitation message is delivered to the sub-terminals 200A, 200B and 200C of the photographing objects, users of the sub-terminals 200A, 200B and 200C receiving the invitation message accept the invitation by executing the service app and connect to the virtual photographing service (e.g., the main terminal 100) (steps S130 and S140).

Figure 4:
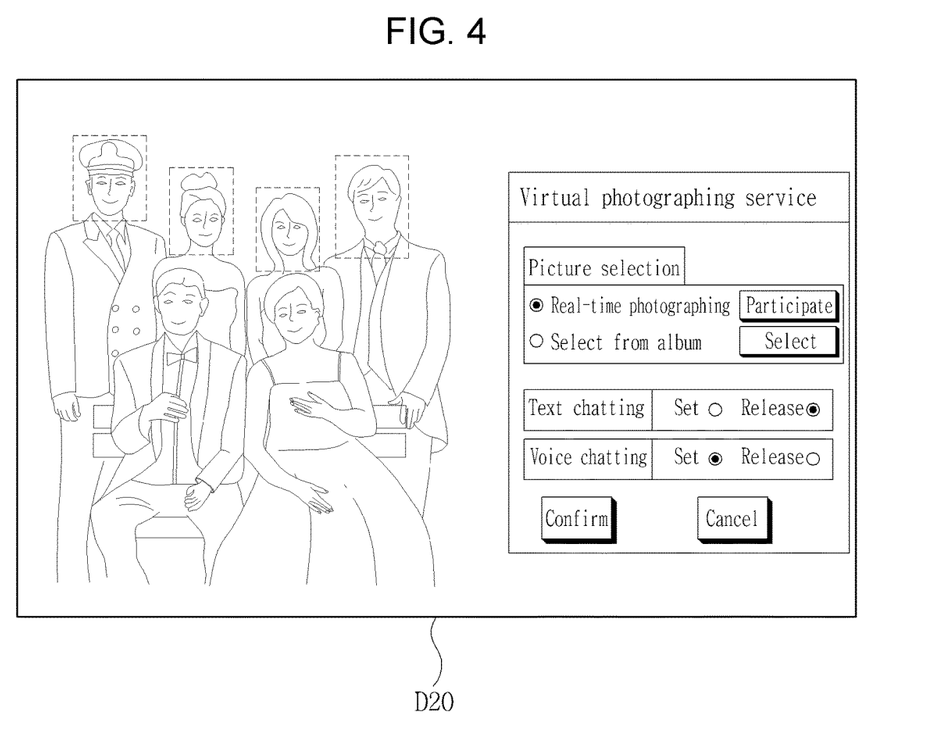
FIG. 4 is a view showing an example of another setting screen of a virtual photographing service according to the present invention.

Then, the terminals drive the camera module provided in each of the terminals and participate in the photographing by selectively transmitting a real-time image (e.g., a still image or a moving image) of a corresponding user or an image stored in an album to the main terminal 100 as shown in the setting screen D20 of FIG. 4. FIG. 4 is a view showing an example of another setting screen of a virtual photographing service according to the present invention.

While the photographing is progressed, the sub-terminals 200A, 200B and 200C associate with the main terminal 100 in real-time and display the photographing screen of the main terminal 100 as is on the terminal screen of their own as shown in FIG. 4 so that the terminal users may see their own views.

In addition, the sub-terminals 200A, 200B and 200C set a chatting type (e.g., text chatting, voice chatting or the like) so that the users may converse (communicate) with each other while the photographing is progressed.

Then, if the service setting described above is completed and the sub-terminals 200A, 200B and 200C receiving the invitation message complete connection to the service (or the main terminal 100), the main terminal 100 specifies a position of each photographing object and performs photographing (step S150). Specifying the position of each photographing object is accomplished according to selection of a user through the setting screen D10 of FIG. 3.

Figure 6:
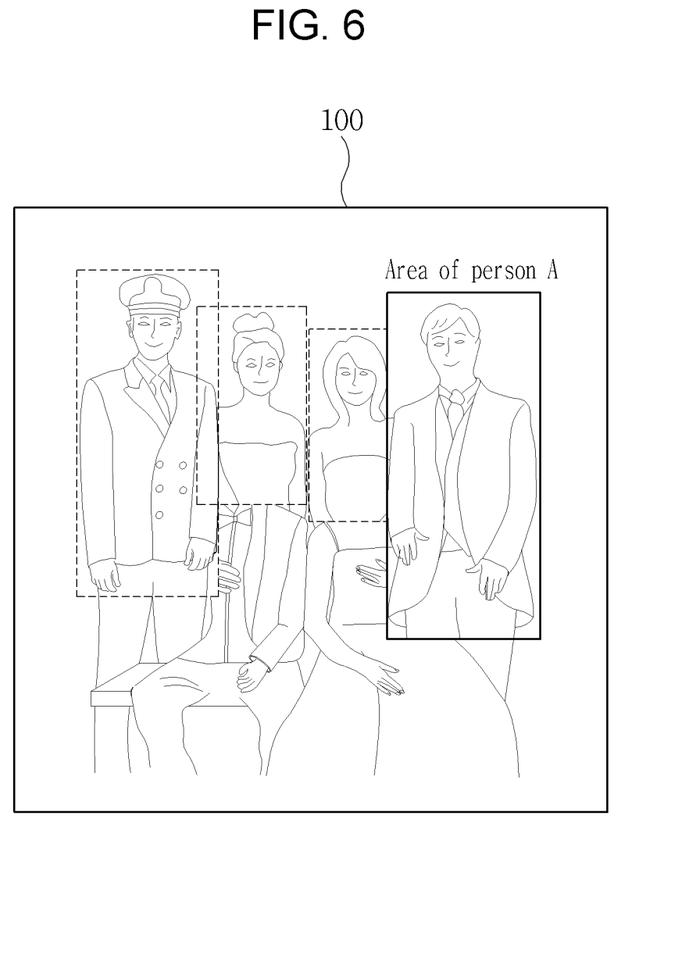
FIG. 6 is an exemplary view showing a screen configuration of a main terminal 100.

Then, if the photographing is completed, the main terminal 100 transfers the photographed image to the server 300 (step S160). When the main terminal 100 transfers the photographed image to the server 300, the main terminal 100 also transfers information on setting front and back relations (hereinafter, referred to as 'front and back relation setting information') of the photographing objects. In the case of FIG. 3, the front and back relation setting information is not very important since the photographing image size of the photographing objects 100, 200A, 200B and 200C is set to 'face' and the faces of the photographing objects do not overlap with each other. However, if the photographing image size is set to 'half body' and the photographing objects 100, 200A, 200B and 200C overlap with each other as shown in FIG. 6, the front and back relation between the photographing objects should be set, and the front and back relation setting information should be transferred to the server 300.

Then, if the photographed image is transferred to the server 300, the server 300 extracts the image of each photographing object from the transferred image according to an object extraction technique (step S170).

At this point, the object extraction technique means a technique of detecting an extraction object by separating the extraction object from the background image along the contour of the object. The object extraction technique includes an object segmentation technique or the like.

The server 300 completes a final image by inserting (overlapping) the extracted images at predetermined positions (step S180). The server 300 inserts the extracted images at predetermined positions of a picture with reference to the front and back relation setting information.

Then, the server 300 stores the completed final image in the memory and transmits the final image to the main terminal 100 and the sub-terminals 200A, 200B and 200C of the photographing objects (step S190).

Figure 5:
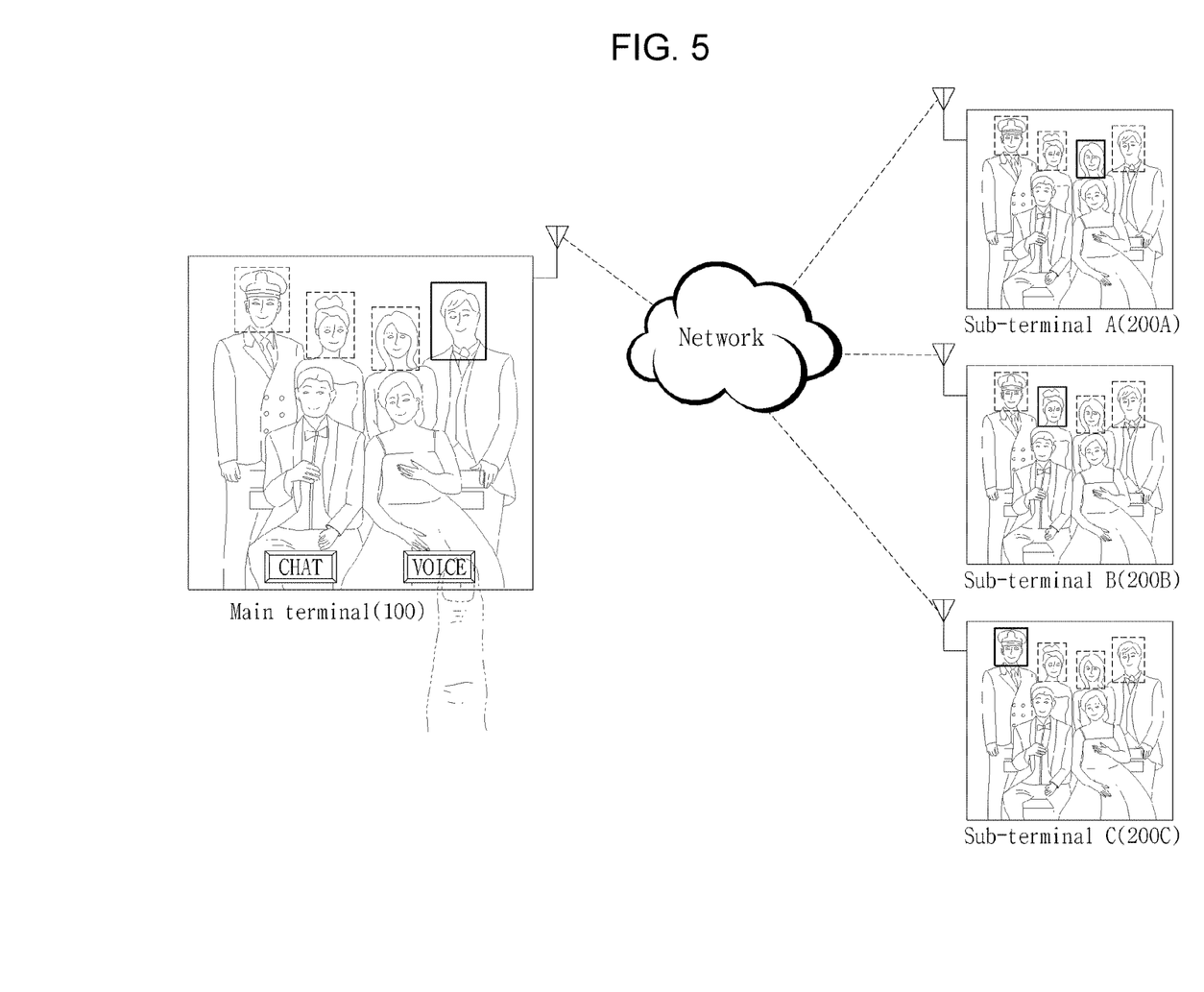
FIG. 5 is an exemplary view showing a terminal screen configured according to the present invention.

FIG. 5 is an exemplary view showing a terminal screen configured according to the present invention, which shows screen configurations displayed on the screens of the main terminal 100 and the sub-terminals 200A, 200B and 200C while photographing is progressed.

At step S150, if a position of each photographing object is specified, the main terminal 100 displays an image of a corresponding photographing object in an area of the specified position as shown in FIG. 5.

The user of the main terminal 100 may converse and communicate with the users of the sub-terminal 200A, 200B and 200C while photographing is progressed by setting the chatting type (e.g., text, voice or the like) as voice as shown in FIG. 5.

Figure 10:
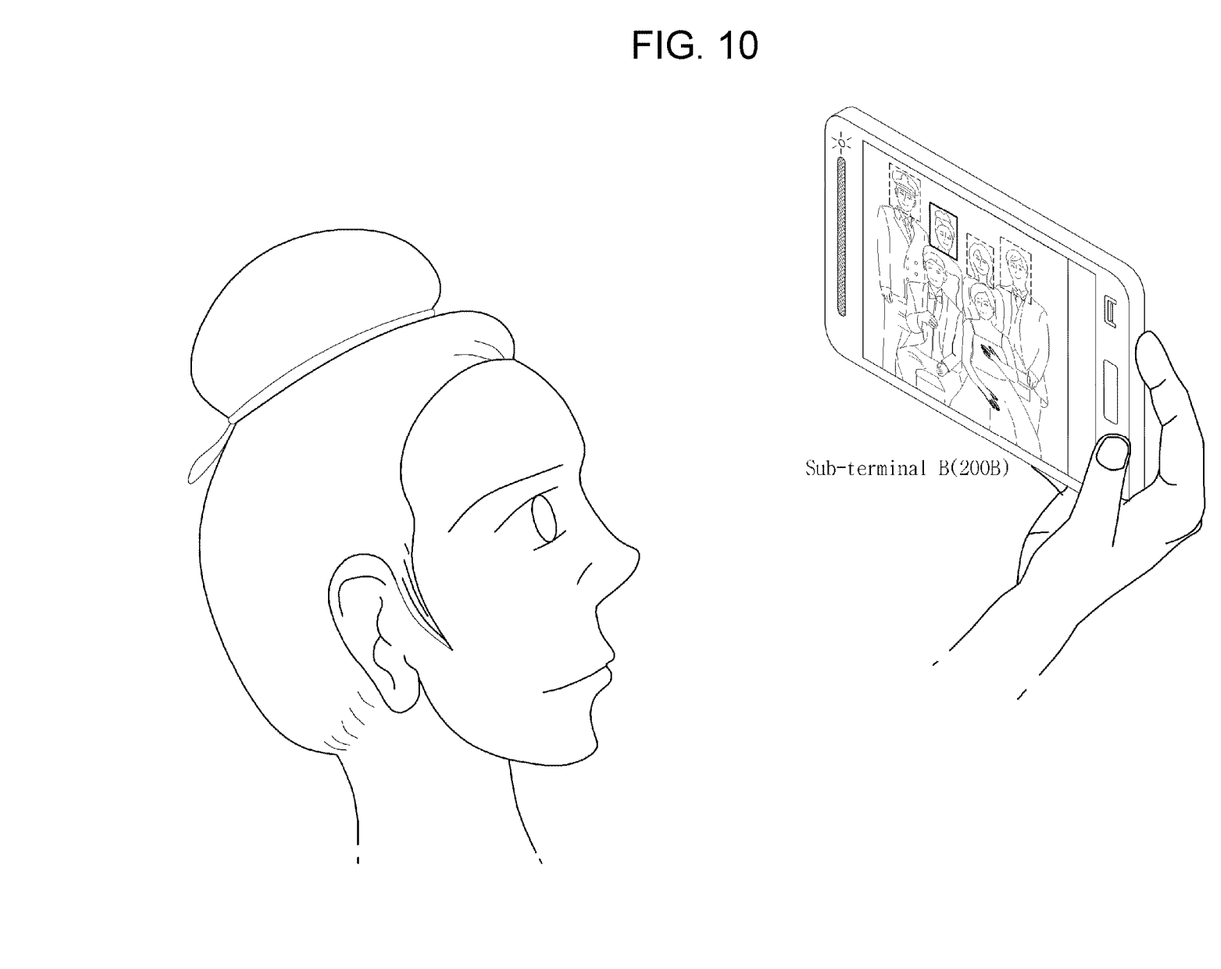
FIG. 10 is a view showing a sub-terminal and a terminal user according to the present invention.

Then, while the photographing is progressed, the sub-terminals 200A, 200B and 200C associate with the main terminal 100 in real-time and display the photographing screen of the main terminal 100 as is on the terminal screen of their own. As shown in FIG. 10, the users of the sub-terminals 200A, 200B and 200C may see their images displayed on the terminal screens and take a proper pose. FIG. 10 is a view showing sub-terminal 200B and a terminal user taking a pose according to the present invention.

Figure 7:
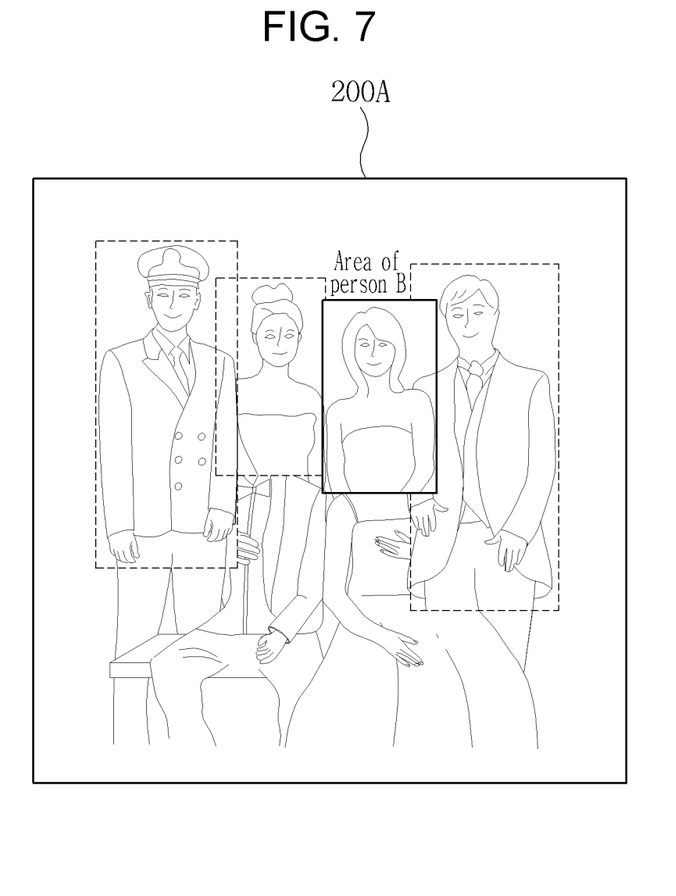
FIG. 7 is an exemplary view showing a screen configuration of sub-terminal 200A.
Figure 8:
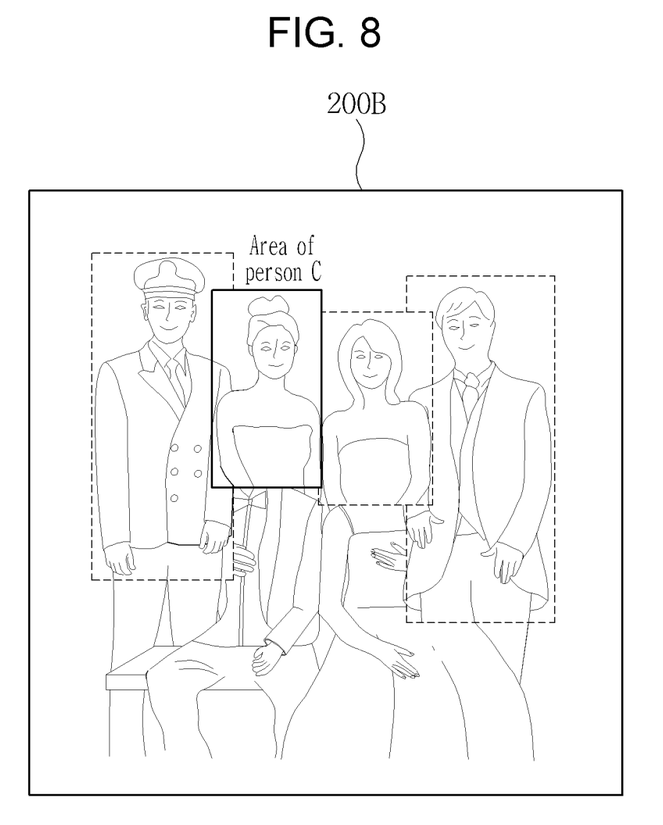
FIG. 8 is an exemplary view showing a screen configuration of sub-terminal 200B.
Figure 9:
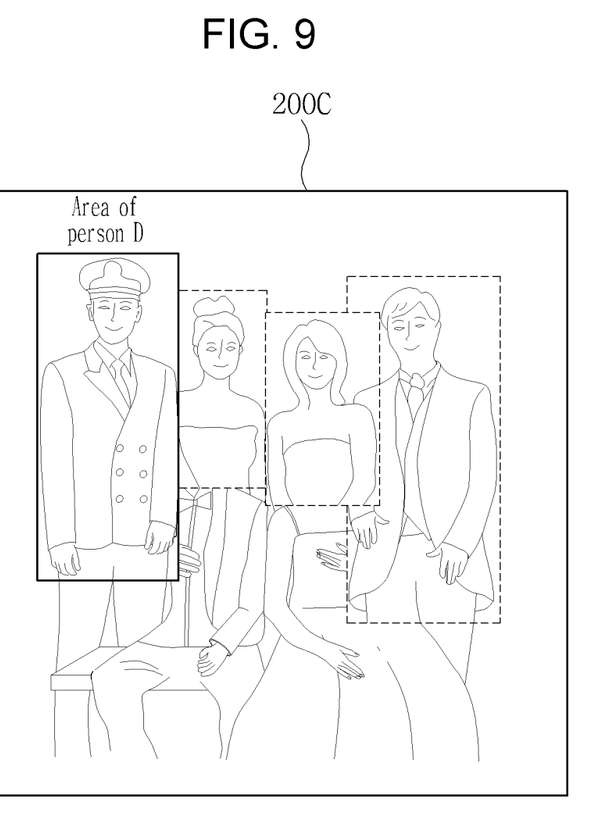
FIG. 9 is an exemplary view showing a screen configuration a sub-terminal 200C.

FIGS. 6 to 9 are exemplary views showing screen configurations of sub-terminals according to the present invention, and FIG. 6 is an exemplary view showing a screen configuration of the main terminal 100, FIG. 7 is an exemplary view showing a screen configuration of sub-terminal 200A, FIG. 8 is an exemplary view showing a screen configuration of sub-terminal 200B, and FIG. 9 is an exemplary view showing a screen configuration of sub-terminal 200C.

As shown in FIGS. 6 to 9, the virtual photographing service according to the example shows screen configurations displayed on the terminals 100, 200A, 200B and 200C when the photographing size (e.g., a face, a half body, a full body or the like) is set to 'half body' and the photographing objects overlap with each other.

While photographing is progressed, the main terminal 100 displays an image of the user of the main terminal 100 in the area of person A as shown in FIG. 6. The main terminal 100 preferentially displays the area of person A regardless of a sequence value of the front and back relation setting information so that the user of the main terminal 100 may confirm an image of himself or herself participating in the photographing.

In the case of the main terminal 100, the user may activate a desired area of a person (e.g., an area of person A, an area of person B, an area of person C or an area of person D) through a screen touch. For example, when the user of the main terminal 100 desires to confirm the pose or clothing of the user of sub-terminal 200A, the main terminal user may confirm the image of the user of sub-terminal 200A by selecting (touching) the area of person B (the user of sub-terminal 200A).

Then, sub-terminal 200A displays an image of the user of terminal 200A in the area of person B as shown in FIG. 7. Sub-terminal 200A displays the area of person B in the forefront of the screen so that the user of terminal 200A may confirm an image of himself or herself participating in the photographing.

Then, sub-terminal 200B displays an image of the user of sub-terminal 200B in the area of person C as shown in FIG. 8. Then, sub-terminal 200C displays an image of the user of sub-terminal 200C in the area of person D as shown in FIG. 9.

The operation of the present invention described herein can be implemented in a recording medium that can be read by a computer using software, hardware or a combination of these.

According to hardware implementation, the embodiments described herein can be implemented using at least one of application specific integrated circuits (ASICs), digital signal processors (DSPs), digital signal processing devices (DSPDs), programmable logic devices (PLDs), field programmable gate arrays (FPGAs, processors, controllers, micro-controllers, microprocessors, and electric units for performing a function. In some cases, the operation examples described in this specification can be implemented by the control unit (or a service app) itself.

According to software implementation, the embodiments such as the procedures and functions described in this specification can be implemented as separate software modules. The software modules may perform one or more functions and operations described in this specification, respectively. A software code can be implemented as a software application created in a proper programming language. The software code can be stored in memory (not shown) and executed by the control unit (or a service app).

Although the present invention has been described with reference to the embodiment(s) shown in the figures, those skilled in the art may make various modifications therefrom and understand that all or some of the embodiments described above may be selectively combined and configured. Therefore, the true technical protection scope of the present invention will be defined by the technical spirit of the appended claims.

As described above, the present invention implements a virtual photographing service system which performs photographing by allowing users at remote sites to participate in an online virtual space.

By implementing a service app for virtual photographing service, the present invention is expected to further easily and conveniently provide functions such as inserting a member (a friend, a family member or the like) who cannot participate in a travel or a meeting, inserting a geese father (a lonely father) living apart from family members in a family photo, leaving video recordings of members participating in an online meeting, providing commemorative photographing with a celebrity (an entertainer, a sport star or the like), providing a photographing service with a star in an online fan club or the like.

INDUSTRIAL APPLICABILITY

By implementing a service app for virtual photographing service, the present invention is expected to further easily and conveniently provide functions such as inserting a member (a friend, a family member or the like) who cannot participate in a travel or a meeting, inserting a geese father (a lonely father) living apart from family members in a family photo, leaving video recordings of members participating in an online meeting, providing commemorative photographing with a celebrity (an entertainer, a sport star or the like), providing a photographing service with a star in an online fan club or the like.

The invention claimed is:
1. A virtual photographing service method comprising the steps of:
   executing a service app according to handling of a user by a main terminal;
   transmitting an invitation message to sub-terminals of photographing objects through the executed service app;
   executing a service app and connecting to the main terminal by each of the sub-terminals, receiving the invitation message;
   specifying a position of each photographing object and performing photographing according to direction of the user by the main terminal, if all the sub-terminals receiving the invitation message complete the connection;
   transferring a photographed image to a server by the main terminal and extracting an image of each photographing object from the transferred image by the server according to a predetermined object segmentation technique;
   completing and storing the image by inserting each of the extracted images at a specified position on a final image by the server; and
   transmitting the completed image to the sub-terminals of the photographing objects,
   wherein the step of connecting to the main terminal by each of the sub-terminals receiving the invitation message includes the steps of:
   accepting the invitation and connecting to the main terminal; and driving a camera module and participating in the photographing by transmitting a moving image of a user in real-time;

further comprising the steps of:

setting, if all the sub-terminals receiving the invitation message complete the connection, a background image type for virtual photographing by the main terminal;

specifying a position of a photographing object on a set background image according to input of the user; and displaying a moving image of a corresponding photographing object in an area of each specified position in the main terminal.

2. The method according to claim 1, wherein the sub-terminals of the photographing objects associate with the main terminal in real-time and display a screen of the main terminal as is on a screen of their own.

3. The method according to claim 1, wherein the step of connecting to the main terminal by each of the sub-terminals receiving the invitation message further includes the step of setting text chatting or voice chatting with the main terminal according to selection of a user.

4. A virtual photographing service system comprising:

a main terminal for transmitting an invitation message to sub-terminals of photographing objects through a predetermined service app and, if all the sub-terminals receiving the invitation message complete connection, specifying a position of each photographing object and performing photographing according to direction of a user;

at least one of sub-terminals for driving a camera module, transmitting a real-time image to the main terminal, and participating in the photographing of the main terminal, if the invitation message is received from the main terminal; and a server for extracting, if a photographed image is received from the main terminal, an image of each photographing object from the received image according to an object segmentation technique, and completing the image by inserting each of the extracted images at a specified position on a final image, wherein the main terminal sets, if all the sub-terminals receiving the invitation message complete the connection, a background image type for virtual photographing, specifies a position of a photographing object on a set background image according to input of the user, and displays a moving image of a corresponding photographing object in an area of each specified position in the main terminal, wherein at least one of the sub-terminals associates with the main terminal in real-time and displays a screen of the main terminal as is on a screen of its own.

* * * * *